United States Patent [19]
Kay et al.

[11] 3,742,433
[45] June 26, 1973

[54] DETECTION APPARATUS

[75] Inventors: Leslie Kay, Brighton, Mass.; Graeme Leslie James, Christchurch, New Zealand

[73] Assignee: National Research Development Corporation, London, England

[22] Filed: June 18, 1971

[21] Appl. No.: 154,476

[52] U.S. Cl. .............................. 340/1 R, 340/3 FM
[51] Int. Cl. .............................................. G01s 9/68
[58] Field of Search ......................... 340/1 R, 3 FM

[56] References Cited
UNITED STATES PATENTS

| | | | |
|---|---|---|---|
| 2,268,587 | 1/1942 | Guanella | 340/3 FM |
| 3,172,075 | 3/1965 | Kay | 340/1 R |
| 3,435,406 | 3/1969 | McCauley | 340/1 R |

Primary Examiner—Richard A. Farley
Attorney—Larson, Taylor & Hinds

[57] ABSTRACT

An apparatus for detecting and providing positional information as to an object in a field of view primarily for aiding blind persons comprising a frequency swept transmitting transducer and two receiving channels receiving reflected frequency swept incoming signals sampled in the channels respectively by encoders fed with time staggered switching pulses to generate a multiplex signal fed to a single variable gain amplifier, the output of which is decoded in the later portions of the two receiving channels to develop audio signals derived from the incoming signals received by the receiving transducers, the amplifier having a gain control circuit responsive to the output of an ambient noise sensor.

4 Claims, 1 Drawing Figure

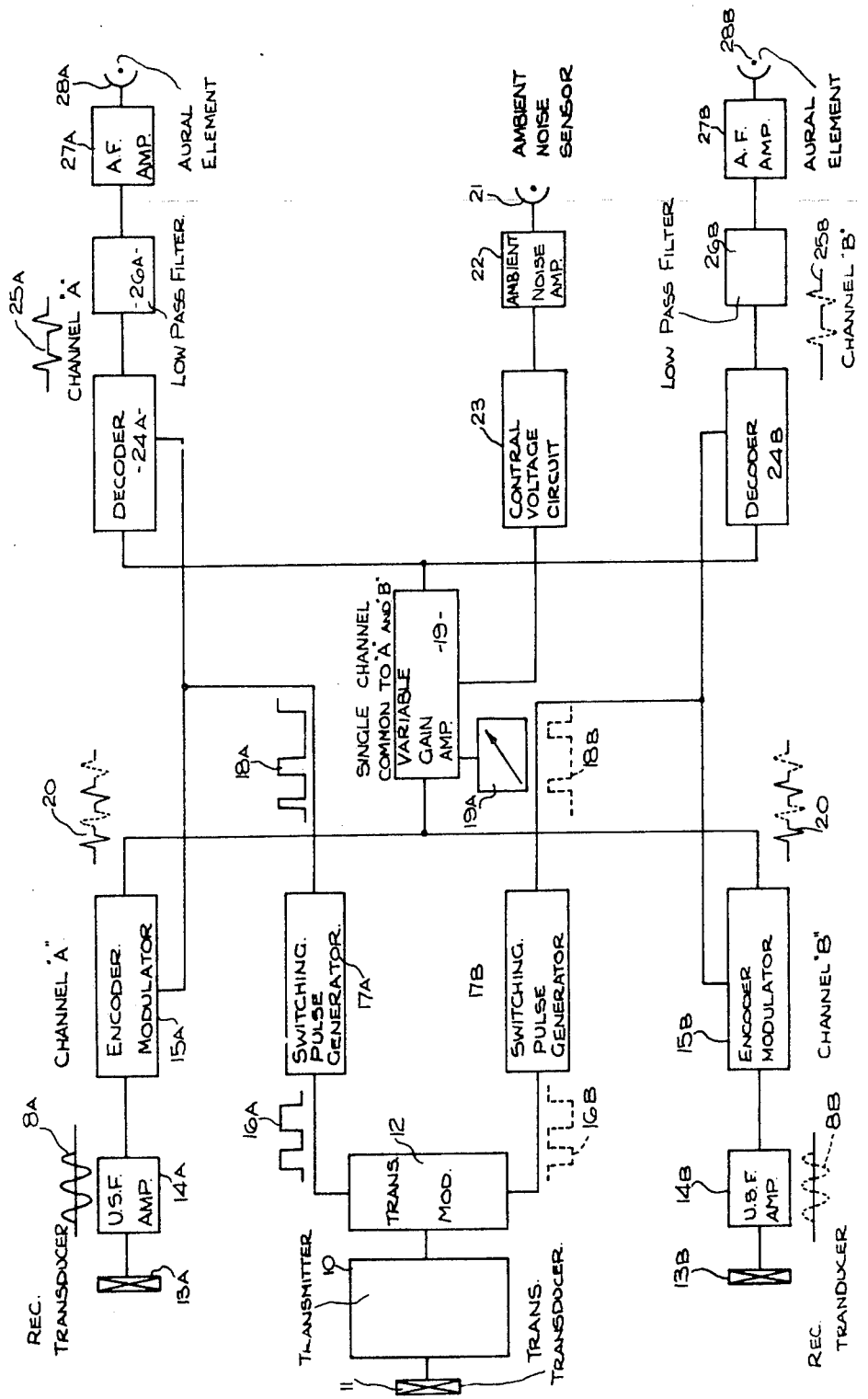

DETECTION APPARATUS

BACKGROUND OF THE INVENTION

1. Field of the Invention

This invention relates to an apparatus for detecting and providing positional information as to an object in a field of view (hereinafter referred to as apparatus of the kind specified) and comprising transmitting means for radiating acoustic wave energy to a field of view, preferably at a frequency above the audible range, and which is varied cyclically through a range of values, receiving means for receiving the wave energy on reflection from an object in the field of view, and including a receiving channel in which is contained a modulator means fed with a local signal of a frequency varying cyclically in conformity with the frequency variation of the transmitting means, so as to heterodyne with an incoming signal in the receiving channel, and produce a beat signal of difference frequency therein, whereof the frequency is within the audible range and varies through a range of values as the range of the object varies from maximum to minimum, and sound reproducing means for presenting the beat signal audibly.

2. Description of the Prior Art

Forms of apparatus of the kind specified intended primarily for aiding blind persons to detect and locate objects in paths of intended movement of such persons are described and claimed in prior U.S. Pat Nos. 3,172,075 and 3,366,922.

Apparatus of the kind specified intrinsically provides information as to the range of an object (this being made manifest to the user by the particular frequency of the beat signal heard), but certain preferred forms of the apparatus as disclosed in both the prior patents include two receiving channels in the receiving means containing respective modulator means feeding respective aural elements for providing audible signals to the left and right-hand ears of the user.

In this form of apparatus information as to the direction of an object in the field of view was achieved in the first form of apparatus disclosed in U.S. Pat. No. 3,172,075 primarily by recognition of a difference in the frequency of the beat signals in the two channels and reproduced by the aural elements thereof requiring the user to face the apparatus towards the object to equalise the frequencies, and partly because the signal reproduced by the aural element consisted of a series of pulses between which there was a time difference when the apparatus was not faced towards the object and which reduced to zero when the apparatus was faced towards the object.

An important improvement or refinement was incorporated in the apparatus disclosed in the second of the two patents, namely U.S. Pat. No. 3,366,922, in that the two channels of the receiving means were fed from respective transducers having receiving characteristics represented by respective polar lobes of which the principal axes diverged and lay on opposite sides of a reference axis extending medially of the field of view with the polar lobes overlapping with each other along the reference axis. The degree of overlap of the polar lobes provided producing sound signals at the aural elements equivalent to those by which the auditory neural system of a human is able to recognise the direction of an audible sound source. This enabled directional information to be obtained by a user such as a blind person without the necessity for scanning, that is swinging the apparatus angularly from side to side (or similarly moving the head, whereas in most cases the apparatus was incorporated in a head set such as a spectacle frame).

Directional information was thus gained by making use of the natural ability of a human observer to identify the direction of a source of sound.

Whilst apparatus of the kind specified made in accordance with the prior patents has attained substantial success, particularly in providing assistance to blind persons, the aural elements of which feed the audible signal developed in the receiver channels to the left and right-hand ears of the user have been designed to perform their function without blocking normal hearing. As a result of this the user has two sources of aural information fed into his ears, namely the signal from the apparatus and ambient noise occurring in whatever environment the apparatus happens to be in use.

The level of the ambient noise may vary very widely and is, for example, low when the apparatus is used in a quiet room and is high when the apparatus is used in a street in which motor traffic is present.

Under conditions of high ambient noise the level thereof may increase to the point at which it will mask or interfere with proper interpretation of the audible signal from the apparatus, and so destroy or impair the ability of the user to judge both range and direction of objects detected, or even prevent them being detected.

If the gain provided by amplifier means included in the device is set to a level in which the audible signals are not masked or impaired under the highest ambient noise level likely to be encountered in normal use, for example a busy street, then the level of the signals provided by the apparatus will appear unacceptably high when the apparatus is used in low levels of ambient noise.

SUMMARY OF THE INVENTION

The object of the present invention is to provide a new or improved form of apparatus of the kind specified whereby this problem is overcome or reduced.

According to the invention an apparatus of the kind specified is provided wherein gain control means responsive to the level of ambient noise is arranged to increase or decrease the amplitude of audible signals furnished to the user with rise or fall respectively in the level of the ambient noise.

In an apparatus of the kind specified wherein the receiving means includes two channels the preferred form of the invention is one in which the receiving means includes an encoding means fed with signal components from the two channels and generating a multiplex signal fed to an amplifier presenting a single channel, said amplifier including said gain control means, and feeding decoding means for separating from the multiplex signal, two audio components derived respectively from the signal components of the two channels for feeding to respective aural elements. The amplifier may thus include a gain control circuit responsive to an electrical quantity (current or voltage) derived from an ambient noise sensing circuit.

One of the major advantages of this arrangement is that the possibility of signals in the two channels being subjected to a different variation in gain (which would militate against the accuracy of positional determination of the object) is entirely avoided.

It is preferred that the encoding means be in the form of a switching circuit means fed with a switching signal of a frequency equal, or related, to that of said local signal, and that the decoding means also be in the form of a switching circuit means fed with the same switching signal, or one of related frequency, for effecting separation of the signal components of the multiplex signal, these components being passed through frequency responsive means to select the beat signal constituent therefrom for onward passage to respective aural elements.

The encoding means and the decoding means may each comprise two switching circuits connected in respective receiving channels, and a pulse generating means may be provided for deriving two trains of pulses with the pulses of one train occurring in the time intervals between the pulses of the other train, one of said trains being fed to the switching circuits in one channel and the other train to the switching circuits in the other channel. With this arrangement the encoding means effect chopping or sampling of the received signal in each channel and the two resultant trains of chopped or sampled received signals are then able to pass through the single channel afforded by the amplifier in time staggered or interlaced relation. The decoding means contained in the receiving channels connected to the output of the amplifier serve to segregate in one channel one train of chopped or sampled signals, and in the other channel the interlaced train of chopped or sampled received signals.

By using a switching signal equal or related in frequency to that of said local signal, the switching circuits which constitute the encoding means also function as a mixing means. Thus, in the single channel of the amplifier, and in the two channels connected to the output thereof, containing the decoding means all frequency components are still present, namely the carrier frequency of the received signal, the frequency of the local signal, and sum and difference components of these two frequencies. By passage through the frequency responsive means connected to the outlets of the decoding means, and which conveniently comprise low pass filter circuits, only the difference frequency components is allowed to pass.

Utilisation of a switching signal equal to, or related to, that of said local signal avoids any undesirable intermodulation which would otherwise occur between the local signal and the switching signal were these to differ in frequency (otherwise than by the relation hereinafter referred to), such intermodulation producing unwanted "tweets" or audio signal components at the aural elements. The expression "related to" is intended to cover cases where the signals so qualified (that is the switching signal and locally generated signal and the switching signal fed to the encoding means and the decoding means) do not have numerically equal frequencies but have a simple harmonic or sub-harmonic relation such that it is possible, upon operation of the decoding means, to extract the required audible signal in the channel concerned without intrusion of unwanted "tweets" or audible components.

BRIEF DESCRIPTION OF THE DRAWING

The invention will now be described, by way of example, with reference to the accompanying drawing illustrating, by way of a block schematic circuit diagram, one embodiment of detection apparatus in accordance with the invention.

DESCRIPTION OF THE PREFERRED EMBODIMENTS

The apparatus comprises a transmitter 10 which includes a frequency swept oscillator feeding a power amplifier, the output of which is radiated in the form of ultrasonic wave energy from a transducer 11 which may be designed either for radiation into a gaseous medium such as air, or into a liquid medium such as water, according to the intended use of the apparatus.

A transmitting modulator 12 provides a square wave signal for controlling the frequency sweep of the oscillator and in a form of apparatus intended for use in air, primarily as an aid for blind persons, a typical frequency sweep would be 80 KHz to 40 KHz in 400 milliseconds. Such a form of apparatus would be suitable for detecting objects at ranges between 6 inches and 25 feet, and as hereinafter described to furnish to the user an audible signal in the range 100 Hz to 5KHZ as the object detected varied in range from the minimum to maximum values indicated.

The apparatus further comprises receiving means providing two receiving channels herein for convenience referred to as channel A and channel B. Since, apart from the time relationships of the signals contained in the two channels A and B, these are of identical form, the following description will refer only to one of these and circuit units contained are designated by a reference numeral and a suffix A for one channel, and by the same reference numeral and a suffix B for the other channel.

Referring to channel A, the received signal is incident at a receiving transducer 13A feeding an ultrasonic frequency amplifier 14A, the output of which is fed to one unit of an encoding means, this being in the form of a switching circuit 15A operating as an encoder and as a modulator for effecting mixing between the incoming received signal and a locally generated signal of the same frequency as that radiated by the transmitter.

As described in more detail in the prior patents already mentioned, the frequency difference between the local signal and the received signal will vary according to the range of the object from which the transmitted signal is reflected, and accordingly the switching circuit 15A operating in its modulating or mixing function will develop inter alia a difference frequency or beat signal, the frequency of which is a function of the range.

In the present form of apparatus, instead of effecting modulation of the incoming signal by means of a locally generated signal of sinusoidal form, the locally generated signal derived from the transmitting modulator 12 and having a square wave form indicated generally at 16A is fed to a switching pulse generator circuit 17A which produces a series of pulses as indicated by the wave form 18A, the pulses of which are centered with respect to the positive going pulses of the wave form 16A but are of shorter duration.

The positive going pulses of the wave form 16A present the same frequency variation as the transmitted signal (in respect of their repetition frequency) and this characteristic is maintained in the wave form 18A which is fed to the switching circuit 15A, and enables it to perform both its encoding function and its modulating or mixing function.

The encoding function is performed by virtue of the fact that the incoming wave form of the received signal indicated at 8A is chopped or sampled by the pulses 18A. A corresponding mode of operation occurs in respect of channel B wherein the corresponding wave forms are indicated by broken lines. In this case, however, the pulses 18B are centered on the spaces between the pulses 16A and consequently the chopping or sampling effected in the switching circuit 15B produces a train of chopped or sampled pulses which is in time staggered or interlaced relation with those appearing at the output of the circuit 15A.

This relationship permits of multiplexing in a single channel afforded by a variable gain amplifier 19 to which the outputs of both circuits 15A and 15B are fed. The resultant wave form consisting of chopped or sampled components from both channels A and B is indicated at 20 with the compenents derived from channel A shown in full lines and the components derived from channel B in broken lines.

The amplifier 19 has a gain which is controlled by the level of ambient noise, that is to say the noise level in the vicinity of the user of the apparatus, and for this purpose a transducer operating as an ambient noise sensor 21 feeds an ambient noise amplifier 22 which in turn feeds a control voltage circuit 23 furnishing at its output a bias voltage to control the gain of the amplifier 19 in any suitable manner.

By controlling the gain in a single channel through which the multiplexed signal passes, there is no possibility of random or inadvertent variation in the gain as between channels A and B.

The relationship between the gain provided by the amplifier 19 and the level of ambient noise is preferably such that the eventual audio signal fed to the ears of the user is maintained at a level which enables it to be clearly heard whatever the ambient noise level. In practice it is considered that the gain is required to be controlled over a range of at least 35 db. and typically the amplifier 19 provides a gain variation of 40 db. from minimum ambient noise level to a normal maximum ambient noise level such as that occurring in a busy street containing motor traffic. Additional overriding manually operable control means 19A can be provided to enable the user to set the level according to individual requirements.

The output of the amplifier 19 is again fed to both channels A and B. Reverting to description only of channel A, this contains a further switching circuit 24A adapted to operate as a decoder. For this purpose it is fed with a switching signal from the switching pulse generator 17A thus providing an output where the positive pulses of the wave form 18A coincide with the output wave form from the amplifier 19. This wave form will be similar to that indicated at 20, although varying in amplitude according to the gain level at which the amplifier is set.

Accordingly at the output of the switching circuit 24A there will only appear signal components corresponding to those illustrated in full lines in the wave form 20A, as shown in wave form 25A, whereas in wave form 25B only the broken line components will be present.

At this stage the signal components contain all the frequencies present at the outputs of the switching circuits 15A and 15B, namely the carrier frequency, the locally generated frequency, and sum and difference frequencies.

The difference frequency constituent is segregated by the provision of the frequency sensitive circuit 26A in the form of a low pass filter which typically, in the case of an aid for blind persons, would have a pass band of which the upper limit is 5 KHz or in this region.

The output from the low pass filter feeds an audio frequency amplifier 27A which in turn feeds a sound reproducing aural element 28A of a construction to feed sound to the user's auditory neural system without interfering, or substantially interfering, with reception of ambient noise by the user in the normal manner.

The receiving transducers 13A and 13B are constructed or arranged to present polar lobes, of which the principal axes diverge, there being some overlap between the lobes along a central median axis. The transmitting transducer 11 may have a characteristic represented by a polar lobe providing approximately uniform field strength within the field of view, for example bounded laterally by lines intersecting with the polar lobes of the receiving transducers in a region about midway between the principal axes of these lobes and their first zeros. Alternatively, the transmitting transducer may have a characteristic represented by a polar lobe providing non-uniform radiation within the field of view having its maximum centered on the median axis but not reducing to zero within the area bounded by the lines just referred to.

In either case the effective or combined characteristic presented by the polar lobes of the transmitting and receiving transducers should be such that subjectively the user receives the same impression as to the position of the source of sound, i.e. the position of the object from which the transmitted wave energy is reflected, as he would receive were this a normal sound source heard by normal hearing. In other words the overall characteristics of the transmitting and receiving transducers should match those of the auditory neural system of a normal human being as more fully disclosed in the prior U.S. Pat. No. 3,366,922.

It is preferred also that the relative positions and/or feed connections between the transducers 13A and 13B and their respective U.S.F. amplifier circuits 14A, 14B be so designed as to avoid or minimise frequency differences in the received signal as between 13A and 13B, and likewise time differences.

While any suitable form of circuit may be employed for the various circuit units already referred to, it is mentioned that one suitable circuit which can be employed for both the switching circuit 15A and the switching circuit 24A is a shunt modulator circuit employing a field effect transistor. The amplifier 19 may be adapted to provide variable gain by incorporation of an amplifying stage including a transistor having an unby-passed emitter resistor of effectively varying value. A suitable arrangement is one in which the fixed or preset value of resistor is connected in parallel with one or more forward biased diodes, the biasing voltage being supplied from the voltage control circuit 23. The diode or diodes required can be provided economically and are relatively free from variations due to temperature changes, whilst the spread of parameters due to production tolerances is acceptable.

The transducer 21 which senses ambient noise may be located at any convenient position, for example adjacent to one of the aural elements 28A, 28B, or alternatively a pair of such transducers 21 may be provided, one adjacent to each aural element 28A, 28B, the output being dependent upon the mean ambient noise level adjacent the two ears of the user. All the elements 11, 13A, 13B, 28A, 28B and 21 may be mounted on a head set, for example of the spectacle type.

The interlaced multiplexing technique established by the use of the switching circuits 15A, 15B enables any significant degree of cross talk between the two channels A and B to be eliminated. It will, however, be understood that other multiplexing techniques could be provided to feed the channel A and channel B signals into a single channel to control the gain in such single channel and thereafter separate the components originally received in the incoming portions of channels A and B.

Further, it will be understood that although there are substantial advantages deriving the two trains of switching signals 17A, 17B each having a frequency equal to that of the frequency swept oscillator and derived conveniently from the transmitter modulator 12, it would be within the scope of the invention to effect chopping or sampling at some other frequency. This would possibly entail performing the encoding function and the modulating or mixing function in two separate circuits and the frequency selected for the chopping or sampling operation would preferably have a subharmonic or harmonic relation to the locally generated frequency (that of the swept frequency oscillator) so as to avoid or minimise difficulties in eliminating intermodulation between the switching signal and the locally generated signal provided for heterodyning with the incoming received signal.

It will be understood that other arrangements for varying the gain of an apparatus of the kind specified may be adopted within the scope of the invention. Thus, for example, where receiving means includes only a single channel, the provision of an encoding means for deriving a multiplex signal would not be necessary. The gain control circuit may then be included at any convenient stage in the circuit, a preferred stage being an audio frequency amplifier interposed between the modulator means and the aural element for audibly reproducing the signal.

An alternative arrangement which could be applied where the receiver means incorporates two channels is one in which the transmitter means incorporates gain control means responsive to ambient noise level for increasing and decreasing the power output from the transmitting transducer.

We claim:
1. Apparatus for detecting and providing positional information as to an object in a field of view comprising:
   a. transmitting means for radiating acoustic wave energy to a field of view at a frequency which is varied cyclically through a range of values,
   b. receiving means for receiving the wave energy on reflection from an object in the field of view and including a receiving channel containing a modulator means,
   c. means for generating a local signal of a frequency varying cyclically and in conformity with the frequency variation of the transmitting means,
   d. means for feeding said local signal to said modulator means to heterodyne with an incoming signal in said receiving channel to produce a beat signal of difference frequency therein whereof the frequency is within the audible range and varies through a range of values as the distance of the object varies from maximum to minimum,
   e. sound reproducing means connected to said receiving channel for reproducing said beat signal audibly,
   f. an ambient noise sensing circuit providing a control voltage dependant upon the level of ambient noise,
   g. gain control means in said receiving channel connected to said sensing circuit and responsive to said control voltage to provide an increase in gain as said ambient noise rises and a decrease in gain as said ambient noise falls.
2. Apparatus according to claim 1 wherein:
   a. said receiving means includes two channels each containing a respective modulator means,
   b. said sound reproducing means comprises respective aural elements for providing audible signals to the left and right-hand ears of the user,
   c. said receiving means includes an encoding means fed with signal components from said two receiving channels and generating a multiplex signal,
   d. said receiving means further includes an amplifier presenting a single channel and fed with said multiplex signal,
   e. said amplifier includes said gain control means,
   f. said receiving means further includes decoding means connected to said amplifier to receive output therefrom and for separating from said multiplex signal two audio components derived respectively from said signal componenets for feeding to said aural elements respectively.
3. Apparatus according to claim 2 wherein:
   a. said encoding means comprises a switching circuit,
   b. said decoding means comprises a switching circuit,
   c. said receiving means includes a switching signal generator connected to supply a switching signal to both said encoding means and said decoding means,
4. Apparatus according to claim 3 wherein:
   a. said encoding means comprises two switching circuits connected in respective receiving channels,
   b. said decoding means comprises two switching circuits connected in said receiving channels,
   c. said switching signal generator comprises a pulse generating means having respective outputs at which are furnished two trains of pulses with the pulses of one train occurring in the time intervals between the pulses of the other train,
   d. one of said outputs of said pulse generating means being connected to said switching circuits in one channel,
   e. the other of said outputs of said pulse generating means being connected to said switching circuits in the other channel.

* * * * *